(12) United States Patent
Yamaguchi

(10) Patent No.: US 11,880,174 B2
(45) Date of Patent: Jan. 23, 2024

(54) DISTURBANCE SUPPRESSION APPARATUS, DISTURBANCE SUPPRESSION METHOD, AND PROGRAM

(71) Applicant: OMRON Corporation, Kyoto (JP)

(72) Inventor: Shohei Yamaguchi, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 147 days.

(21) Appl. No.: 17/427,824

(22) PCT Filed: Jan. 17, 2020

(86) PCT No.: PCT/JP2020/001462
§ 371 (c)(1),
(2) Date: Aug. 2, 2021

(87) PCT Pub. No.: WO2020/162140
PCT Pub. Date: Aug. 13, 2020

(65) Prior Publication Data
US 2022/0128954 A1  Apr. 28, 2022

(30) Foreign Application Priority Data
Feb. 4, 2019  (JP) .................. 2019-017831

(51) Int. Cl.
*G05B 11/42* (2006.01)
*G05B 13/04* (2006.01)

(52) U.S. Cl.
CPC ............ *G05B 11/42* (2013.01); *G05B 13/042* (2013.01); *G05B 13/048* (2013.01)

(58) Field of Classification Search
CPC ..... G05B 11/42; G05B 13/042; G05B 13/048
(Continued)

(56) References Cited

U.S. PATENT DOCUMENTS

2008/0255814 A1  10/2008  Chia et al.
2016/0282822 A1*  9/2016  Perez ................... G05B 13/047

FOREIGN PATENT DOCUMENTS

JP  H05289701 A  11/1993
JP  2000214902 A  8/2000
(Continued)

OTHER PUBLICATIONS

International Search Report for International Application No. PCT/JP2020/001462; dated Mar. 3, 2020.
(Continued)

*Primary Examiner* — Jigneshkumar C Patel
(74) *Attorney, Agent, or Firm* — CANTOR COLBURN LLP

(57) ABSTRACT

A disturbance suppression apparatus includes a timing prediction device. The timing prediction device includes a dead time acquisition unit, a disturbance start time acquisition unit, and a timing prediction unit. The dead time acquisition unit performs PID tuning to acquire a dead time. The disturbance start time acquisition unit acquires a disturbance start time representing a period from a time point at which a start signal is input to a time point at which a temperature starts to be affected by a disturbance. The timing prediction unit predicts a disturbance manipulated variable application timing on the basis of the dead time and the disturbance start time.

10 Claims, 8 Drawing Sheets

(58) Field of Classification Search
USPC .......................................................... 700/42
See application file for complete search history.

(56) References Cited

FOREIGN PATENT DOCUMENTS

| | | |
|---|---|---|
| JP | 2000227801 A | 8/2000 |
| JP | 2009193192 A | 8/2009 |

OTHER PUBLICATIONS

EPO Extended European Search Report for corresponding EP Application No. 20753121.1; dated Sep. 20, 2022.
Normey et al., "Control of Dead Time Process", 6.3 Improving the Disturbance Rejection Capabilities, pp. 177-188.
Normey-Rico et al., "Control of Dead-time Processes", see pp. 166-189; 27 pages.

* cited by examiner

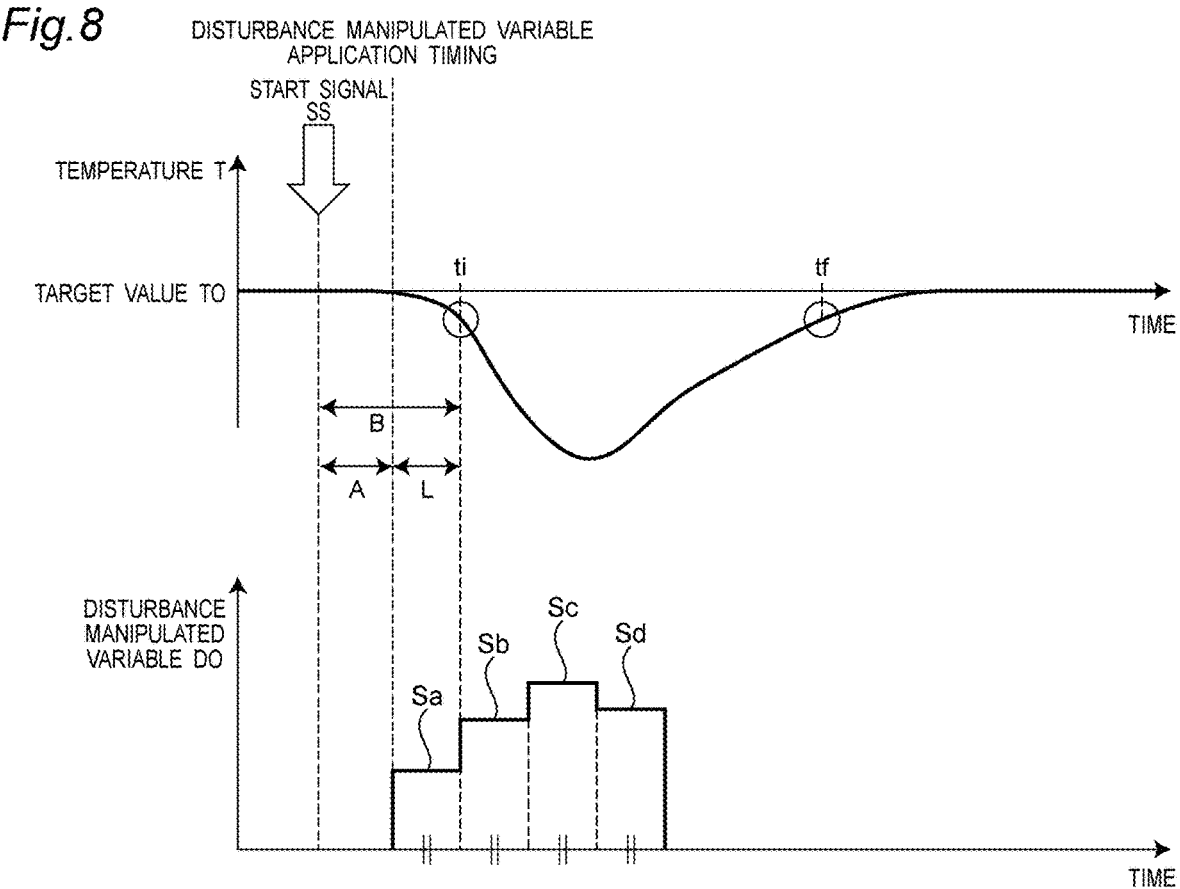

DISTURBANCE SUPPRESSION APPARATUS, DISTURBANCE SUPPRESSION METHOD, AND PROGRAM

CROSS REFERENCE TO RELATED APPLICATIONS

This is the U.S. national stage of application No. PCT/JP2020/001462, filed on Aug. 4, 2021. Priority under 35 U.S.C. § 119(a) and 35 U.S.C. § 365(b) is claimed from Japanese Application No. 2019-017831, filed Feb. 4, 2019, the disclosure of which is also incorporated herein by reference.

TECHNICAL FIELD

The present invention relates to a disturbance suppression apparatus, a disturbance suppression method, and a program, and for example, relates to a disturbance suppression apparatus, a disturbance suppression method, and a program that can suppress the influence of a disturbance on a control system.

BACKGROUND ART

There is a technique of predicting a disturbance applied to a feedback control system and reducing the influence of the disturbance on the control system (for example, Patent Document 1: JP 2000-227801 A). Patent Document 1 describes a disturbance manipulated variable prediction means and a disturbance manipulated variable application means. The disturbance manipulated variable prediction means predicts a disturbance manipulated variable for canceling a disturbance. When a disturbance is applied, the disturbance manipulated variable application means adds the disturbance manipulated variable to a manipulated variable from a PID control means so as to cancel the disturbance. This suppresses the influence of the disturbance for a controlled target.

PRIOR ART DOCUMENT

Patent Document

Patent Document 1: JP 2000-227801 A

SUMMARY OF THE INVENTION

Problems to be Solved by the Invention

However, since there is a dead time in the control system, even if the manipulated variable is applied to the controlled target, an output corresponding to the manipulated variable does not appear immediately (is not detected). In this case, the "dead time" is an index indicating the speed responsiveness of the control system. That is, when an input (manipulated variable) is added, the output (change in controlled value) does not appear immediately but appears with a delay of a time L. The time L is a dead time. There is a demand for a disturbance suppression apparatus capable of appropriately and easily suppressing the influence of disturbance in consideration of the dead time.

Therefore, an object of the present invention is to provide a disturbance suppression apparatus, a disturbance suppression method, and a program that can appropriately and easily suppress the influence of disturbance in consideration of a dead time.

Means for Solving the Problems

In order to solve the above problem, a disturbance suppression apparatus according to the this disclosure is a disturbance suppression apparatus that suppresses the influence of a disturbance on a control system and is characterized in that the control system includes a controlled target and a PID controller that outputs a PID manipulated variable to the controlled target so as to eliminate a deviation between a target value and a controlled value, the disturbance suppression apparatus includes a disturbance manipulated variable prediction unit that predicts a disturbance manipulated variable that acts in response to a disturbance applied to the control system so as to cancel the disturbance, a disturbance manipulated variable application unit that can apply the disturbance manipulated variable to the PID manipulated variable, and a timing prediction device that predicts a disturbance manipulated variable application timing at which the disturbance manipulated variable is to be applied to the PID manipulated variable, and the timing prediction device includes a dead time acquisition unit that performs PID tuning on the control system to adjust a control parameter of the PID controller to acquire a dead time (L) representing a period from when the PID manipulated variable is changed to when the controlled value starts to change, a disturbance start time acquisition unit that receives a start signal related to a disturbance occurrence timing from the outside and acquires a disturbance start time (B) representing a period from a time point at which the start signal is input to a time point at which the controlled value starts to be affected by the disturbance, and a timing prediction unit that predicts the disturbance manipulated variable application timing based on the dead time (L) and the disturbance start time (B).

In the present specification, the PID control (unit) is a type of feedback control and performs proportional control (P control), integral control (I control), and differential control (D control). "PID tuning" means the processing of adjusting control parameters such as a gain.

In addition, the "disturbance manipulated variable" means a manipulated variable applied with the lapse of time in order to cancel the disturbance. If the influence of the disturbance on the control system is formalized with the lapse of time, the disturbance manipulated variable is also formalized (patterned) with the lapse of time.

Further, receiving a start signal related to the disturbance occurrence timing from the "outside" refers to a case in which a signal related to the timing of the processing of a system higher than the disturbance suppression apparatus is received from the system of the disturbance suppression apparatus that performs the processing of applying a disturbance (influence) to the outside of the disturbance suppression apparatus, for example, the control system.

In the disturbance suppression apparatus according to this disclosure, the dead time acquisition unit performs the PID tuning for adjusting a control parameter of the PID controller to acquire the dead time (L). The disturbance start time acquisition unit acquires a disturbance start time (B) representing a period from a time point at which the start signal is input to a time point at which the controlled value starts to be affected by the disturbance. Then, the timing prediction unit predicts a disturbance manipulated variable application timing on the basis of the dead time (L) and the disturbance start time (B) (this prediction may be done automatically). Therefore, the disturbance manipulated variable for canceling the disturbance of which application is predicted can be applied to the PID manipulated variable at an appropriate timing (that is, the timing in consideration of the dead time (L)). Therefore, the influence of the disturbance can be appropriately and simply suppressed.

The disturbance suppression apparatus according to one embodiment is characterized in that, when the disturbance start time (B) is equal to or longer than the dead time (L), the timing prediction unit predicts, as the disturbance manipulated variable application timing, a time point at which a time represented by a difference between the disturbance start time (B) and the dead time (L) elapses from a time point at which the start signal is input.

The disturbance suppression apparatus according to this embodiment can predict an appropriate disturbance manipulated variable application timing in a case in which the disturbance start time (B) is equal to or longer than dead time (L).

The disturbance suppression apparatus according to one embodiment is characterized in that, when the disturbance start time (B) is less than the dead time (L), the timing prediction unit predicts, as the disturbance manipulated variable application timing, a time point at which the start signal is input.

The disturbance suppression apparatus according to this embodiment can apply a disturbance manipulated variable to a PID manipulated variable without any waiting time after the input of the start signal in a case in which the disturbance start time (B) is less than the dead time (L).

The disturbance suppression apparatus according to an embodiment is characterized by further including a notification device that notifies that the disturbance start time (B) is less than the dead time (L) when the disturbance start time (B) is less than the dead time (L).

In the disturbance suppression apparatus of this embodiment, the notification device notifies that the disturbance start time (B) is less than the dead time (L). Therefore, when the user recognizes the notification, the user can correct the transmission timing of the start signal (for example, can quicken the transmission timing).

According to another aspect, a disturbance suppression method according this disclosure is a disturbance suppression method that suppresses the influence of a disturbance on a control system and is characterized in that the control system includes a controlled target and a PID controller that outputs a PID manipulated variable to the controlled target so as to eliminate a deviation between a target value and a controlled value, and the disturbance suppression method includes predicting a disturbance manipulated variable that acts in response to a disturbance applied to the control system so as to cancel the disturbance, performing PID tuning on the control system to adjust a control parameter of the PID controller to acquire a dead time (L) representing a period from when the PID manipulated variable is changed to when the controlled value starts to change, receiving a start signal related to a disturbance occurrence timing from the outside and acquiring a disturbance start time (B) representing a period from a time point at which the start signal is input to a time point at which the controlled value starts to be affected by the disturbance, predicting the disturbance manipulated variable application timing based on the dead time (L) and the disturbance start time (B), and applying the disturbance manipulated variable to the PID manipulated variable based on the disturbance manipulated variable application timing.

In the disturbance suppression method according to this disclosure, a disturbance manipulated variable acting in response to a disturbance applied to the control system so as to cancel the disturbance is predicted. The PID tuning is performed to acquire the dead time (L). The disturbance start time (B) is acquired from the outside using the start signal related to the disturbance occurrence timing. A disturbance manipulated variable application timing is predicted on the basis of the dead time (L) and the disturbance start time (B) (this prediction may be done automatically). Then, the disturbance manipulated variable is applied to the PID manipulated variable on the basis of the disturbance manipulated variable application timing. Therefore, the disturbance manipulated variable for canceling the disturbance of which application is predicted can be applied to the PID manipulated variable at an appropriate timing (that is, the timing in consideration of the dead time (L)). Therefore, the influence of the disturbance can be appropriately and simply suppressed.

According to still another aspect, a program according to this disclosure is a program for causing a computer to execute a disturbance suppression method.

The disturbance suppression method can be implemented by causing a computer to execute the program according to this disclosure.

Effects Of The Invention

As is obvious from the above, according to the disturbance suppression apparatus and the disturbance suppression method according to this disclosure, it is possible to appropriately and easily suppress the influence of a disturbance in consideration of a dead time. In addition, the disturbance suppression method can be implemented by causing a computer to execute the program according to this disclosure.

BRIEF DESCRIPTION OF THE DRAWINGS

FIG. 8 is a graph for explaining an operation of the heating device control process in the temperature control device.

MODES FOR CARRYING OUT THE INVENTION

Embodiments of the present invention will be described in detail below with reference to the accompanying drawings.

Figure 1:
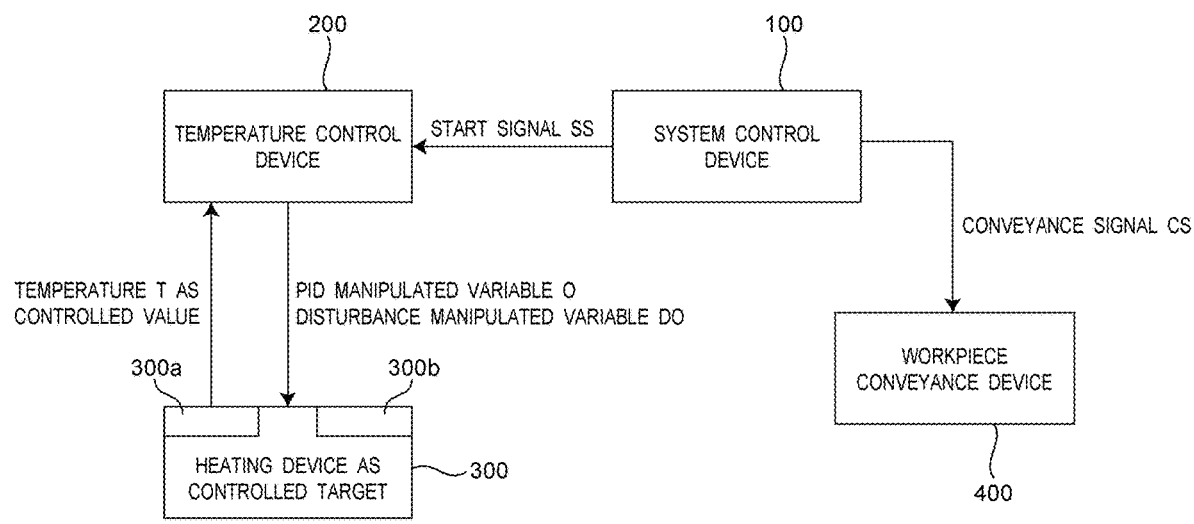
FIG. 1 is a diagram illustrating a schematic configuration of an entire system according to an embodiment.

FIG. 1 illustrates the configuration of a control system according to this embodiment. The control system includes a system control device 100, a temperature control device 200 to which a disturbance suppression apparatus according to one embodiment is applied, a heating device as a controlled target (hereinafter, simply referred to as a "heating device") 300, and a workpiece conveyance device 400. As illustrated in FIG. 1, the system control device 100 is communicably connected to the temperature control device 200 and the workpiece conveyance device 400. The temperature control device 200 is communicably connected to the heating device 300. The connection method described here may be wired connection or wireless connection.

In the system illustrated in FIG. 1, the workpiece conveyance device 400 conveys an object to be heated (not illustrated) to the heating device 300. The heating device 300 performs a heating treatment on the object to be heated, thereby generating an article after the heating treatment.

The system control device 100 is in charge of controlling the entire system. The system control device 100 transmits a start signal SS related to a disturbance occurrence timing (to be described later) to the temperature control device 200, and transmits a conveyance signal CS related to conveyance control of the object to be heated and the article after the heating treatment to the workpiece conveyance device 400. Based on the conveyance signal CS, the workpiece conveyance device 400 controls the movement of the object to be heated from the outside of the system to the heating device 300 and the movement of the article after the heating treatment from the heating device 300 to the outside of the system. The heating device 300 performs a heating treatment on the object to be heated conveyed to the heating device 300.

The temperature control device 200 controls the temperature of a heating body 300a included in the heating device 300 such that a heating treatment at a desired temperature is implemented in the heating device 300. The heating device 300 includes a temperature sensor 300b capable of detecting the temperature of a heating treatment. The detection value of the temperature sensor 300b is a temperature T as a controlled value (to be simply referred to as "temperature T" hereinafter). The temperature control device 200 transmits a signal including a PID manipulated variable O to the heating device 300 so that the temperature T becomes a target value TO. The heating device 300 then controls the heating of the heating body 300a using the received signal including the PID manipulated variable O so that the temperature T of the heating treatment becomes the target value TO.

Figure 2:
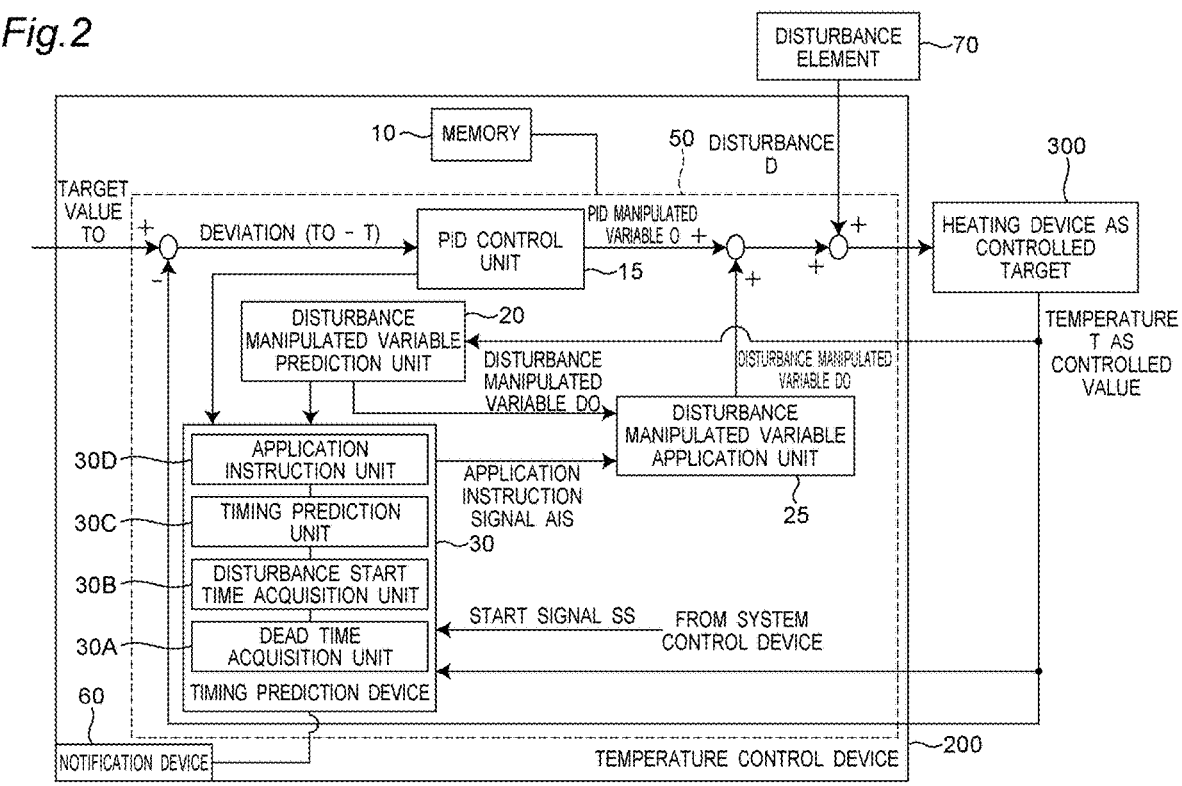
FIG. 2 is a diagram illustrating a configuration of a temperature control device to which a disturbance suppression apparatus according to the embodiment is applied.

FIG. 2 illustrates a specific configuration example of the temperature control device 200. The temperature control device 200 includes a memory 10, a processor 50, and a notification device 60. The processor 50 implements functions as a PID controller 15, a disturbance manipulated variable prediction unit 20, a disturbance manipulated variable application unit 25, and a timing prediction device 30. A program for controlling the temperature control device 200 including a disturbance suppression method to be described later is stored in the memory 10. The processor 50 is communicably connected to the memory 10 and reads a program from the memory 10. Thus, the processor 50 executes various operations including the disturbance suppression method. Note that the processor 50 is communicably connected to the notification device 60.

As illustrated in FIG. 2, the PID controller 15 in the temperature control device 200 constitutes a control system that controls the heating device 300 as a controlled target. The PID controller 15 outputs the PID manipulated variable O to the heating device 300 so as to eliminate a deviation (TO−T) between the target value TO and the temperature T (as described above, the detected temperature T of the temperature sensor 300b).

When the operation of the system illustrated in FIG. 1 is started and the conveyance of the object to be heated into the system is started, as illustrated in FIG. 2, a disturbance D due to a disturbance element 70 associated with the start of the operation occurs. In this case, examples of the disturbance element 70 include the inflow of air into the system accompanying the entry of an object to be heated into the system and a decrease in the temperature of the heating body 300a due to the contact of the object to be heated with the heating body 300a. In this case, in this system, the disturbance element 70 is predictable. Therefore, each disturbance D corresponding to each disturbance element 70 applied to the control system can also be predicted in advance.

Accordingly, the disturbance manipulated variable prediction unit 20 in the temperature heating device 200 predicts a disturbance manipulated variable DO (see FIGS. 1 and 2) acting to cancel the disturbance D corresponding to the disturbance D applied to the control system. Furthermore, as illustrated in FIG. 2, the disturbance manipulated variable application unit 25 can apply the disturbance manipulated variable DO predicted by the disturbance manipulated variable prediction unit 20 to the PID manipulated variable O.

In this case, as illustrated in the lower part of FIG. 8, the disturbance manipulated variable DO is a manipulated variable applied with the lapse of time in order to cancel the disturbance. If the influence of the disturbance on the control system is formalized with the lapse of time, the disturbance manipulated variable DO is also formalized (patterned) with the lapse of time. In this example, the pattern is a stepwise pattern. Note that the disturbance element 70, the disturbance D, the disturbance manipulated variable DO, the operation of the PID controller 15, the operation of the disturbance manipulated variable prediction unit 20, the operation of the disturbance manipulated variable application unit 25, and the like are described in detail in JP 2000-227801 A, for example.

As illustrated in FIG. 2, the temperature controller 200 according to this embodiment includes the timing prediction device 30. The timing prediction device 30 predicts the disturbance manipulated variable application timing at which the disturbance manipulated variable DO is to be applied to the PID manipulated variable O in consideration of a dead time L. In this case, the dead time L in this specification is a period from when the PID manipulated variable O is changed to when the temperature T starts changing (see FIG. 8). As illustrated in FIG. 2, the timing prediction device 30 includes a dead time acquisition unit 30A, a disturbance start time acquisition unit 30B, a timing prediction unit 30C, and an application instruction unit 30D as functional blocks.

In the following description of the operation, the operations of the PID controller 15, the disturbance manipulated variable prediction unit 20, the disturbance manipulated variable application unit 25, and the timing prediction device 30 (more specifically, each of the blocks 30A to 30D described above) will be described in detail.

The operation of the temperature control device 200 according to this embodiment will be described below. The operation is roughly divided into two processes. One is a preparation process, and the other is a heating device control process.

(Operation of Preparation Process)

Figure 3:
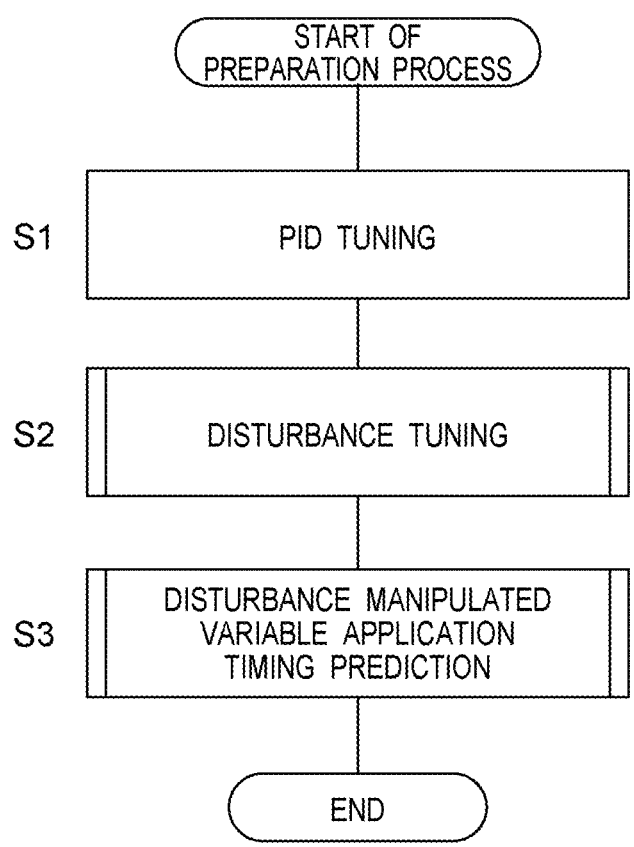
FIG. 3 is a flowchart illustrating a procedure of a preparation processing operation for disturbance suppression in the temperature control device.

FIG. 3 illustrates a procedure of a preparation processing operation for disturbance suppression in the temperature control device 200. First of all, in step S1, the PID controller 15 illustrated in FIG. 2 performs PID tuning. The PID tuning is executed to adjust control parameters (the gain, proportional band, integration time, differential time, and the like) of the PID controller 15 corresponding to the control system including the heating device 300. In this case, as PID tuning, for example, autotuning by a limit cycle method as described in detail in JP 2005-284828 A can be adopted. Note that control parameters may be adjusted by autotuning by a step response method, a system identification method by a least squares method, or the like.

Next, in step S2 in FIG. 3, the disturbance manipulated variable prediction unit 20 illustrated in FIG. 2 performs disturbance tuning. As described above, the disturbance element 70 illustrated in FIG. 2 is generated with the start of the operation of the process (conveyance and heating) for the object to be heated using the heating device 300 and the workpiece conveyance system 400. The disturbance element 70 can be specified in advance. Since the disturbance manipulated variable prediction unit 20 predicts the disturbance manipulated variable DO corresponding to the predictable disturbance D applied by the start of the operation of the above processing, the disturbance manipulated variable prediction unit 20 performs the disturbance tuning.

In the heating device control process described later, the disturbance manipulated variable DO is added to the PID manipulated variable O in a feedforward manner. As a result, the operation signals O and DO that cancel the disturbance D can be provided to the heating device 300 during the heating device control process.

Figure 4:
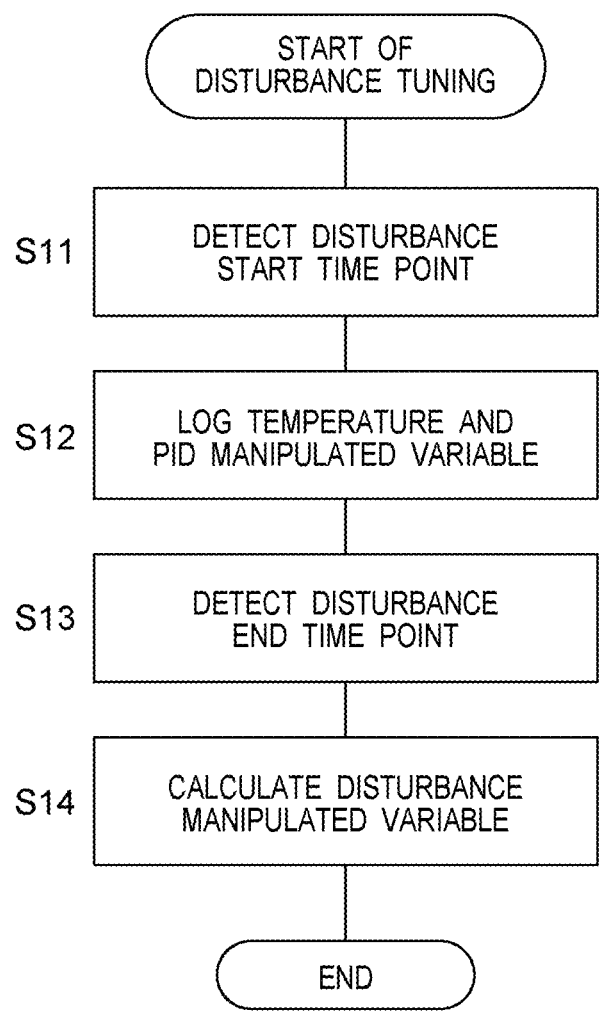
FIG. 4 is a flowchart illustrating a procedure of a disturbance tuning operation included in the preparation processing operation in FIG. 3.
Figure 5:
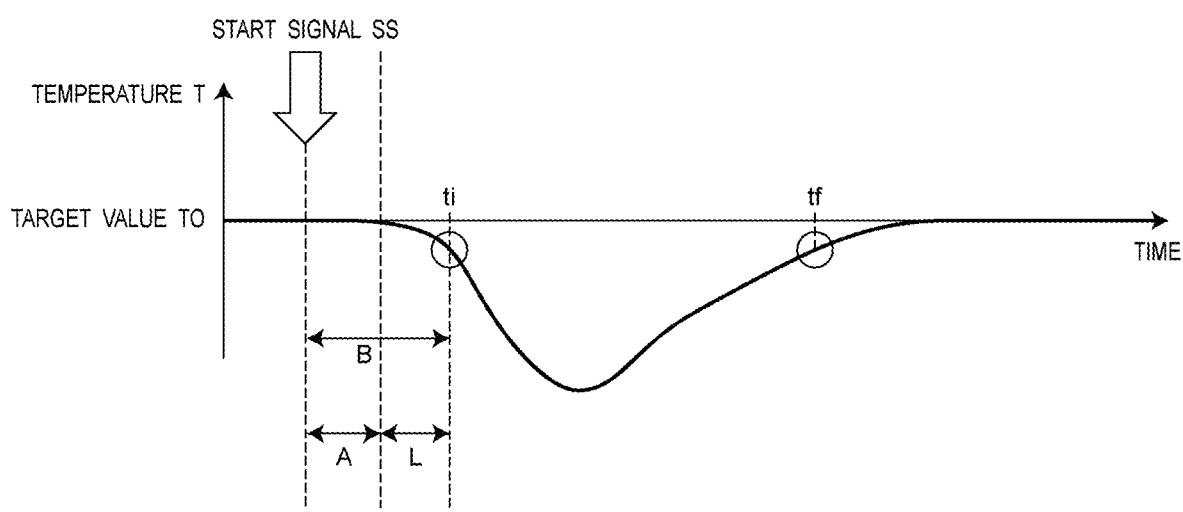
FIG. 5 is a graph for explaining an operation of predicting a disturbance manipulated variable application timing.

The operation of determining the disturbance manipulated variable DO by the disturbance tuning in step S2 in FIG. 3 will be described here with reference to FIGS. 4 and 5. FIG. 4 illustrates each operation of the disturbance tuning. FIG. 5 illustrates an example of a waveform that can be acquired by the disturbance tuning by the disturbance manipulated variable prediction unit 20. Referring to FIG. 5, the abscissa represents time, and the ordinate represents the temperature T. Accordingly, FIG. 5 exemplarily illustrates a waveform indicating a temporal change in the temperature T during the disturbance tuning. FIG. 5 also illustrates the target value TO.

First of all, the control system described above creates a state in which the temperature T substantially matches the target value TO. Thereafter, the disturbance manipulated variable prediction unit 20 starts the disturbance tuning. Specifically, in the preparation process, the operation of the process (conveyance and heating) for the object to be heated is started (see the "start signal SS" in FIG. 5). When the system control device 100 transmits the start signal SS to the temperature control device 200, the disturbance manipulated variable prediction unit 20 can recognize the time point of the start of the operation. Then, upon receiving the start signal SS, the disturbance manipulated variable prediction unit 20 starts the disturbance tuning. As described above, the start signal SS is a signal related to the disturbance occurrence timing.

Thereafter, only the normal PID feedback control is performed without performing the process of canceling the disturbance D. That is, after the start of the operation, the control system executes only PID control (that is, feedback control for matching the temperature T with the target value TO) using the temperature T, the target value TO, and the PID manipulated variable O in a state in which the disturbance D is applied to the control system. In this manner, the disturbance D is applied after the start of the operation, and the feedback control is executed.

After the start of the operation, during the feedback control, the disturbance manipulated variable prediction unit 20 detects a disturbance start time point ti (see FIG. 5) (step S11 in FIG. 4). In this case, the disturbance start time point ti means a time point when the temperature deviation |TO−T| between the target value TO and the temperature T exceeds a preset temperature threshold Tth after the start of the operation.

After step S11, the disturbance manipulated variable prediction unit 20 logs (records) the temperature T and the PID manipulated variable O in time series while performing the feedback control (step S12). Then, the disturbance manipulated variable prediction unit 20 detects a disturbance end time point tf (see FIG. 5) (step S13). Here, the disturbance end time point tf means a time point when the temperature deviation |TO−T| falls below the preset temperature threshold Tth after step S11. After step S13, the logging (recording) of the temperature T and the PID manipulated variable O ends.

After step S13, the disturbance manipulated variable prediction unit 20 calculates (predicts) the disturbance manipulated variable DO as illustrated in the lower part of FIG. 8 using each temperature T and each PID manipulated variable O recorded in step S12 (step S14). In this case, the prediction of the disturbance manipulated variable DO and the disturbance tuning are described in detail in, for example, JP 2000-227801 A.

In this manner, the disturbance tuning (step S2 in FIG. 3) ends.

After step S2 in FIG. 3 ends (after the disturbance manipulated variable DO prediction), the timing prediction device 30 illustrated in FIG. 2 predicts the disturbance manipulated variable application timing (step S3 in FIG. 3). The operation in step S3 will be described next in detail with reference to FIGS. 2, 5, and 6. In this case, FIG. 6 illustrates a procedure for a prediction operation of the disturbance manipulated variable application timing.

Figure 6:
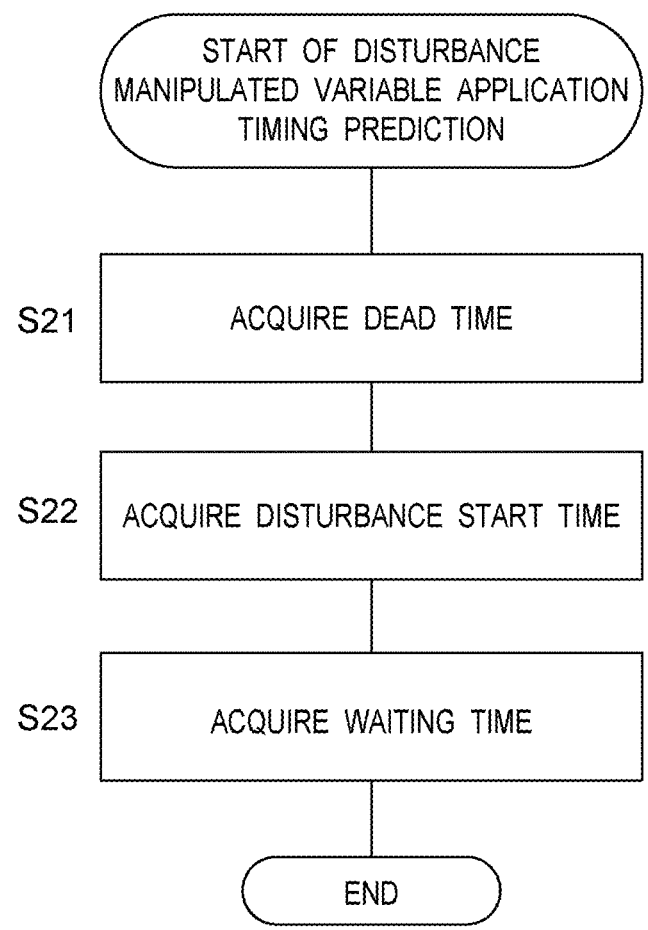
FIG. 6 is a flowchart illustrating a procedure of a disturbance manipulated variable application timing prediction operation included in the preparation processing operation in FIG. 3.

In step S21 in FIG. 6, the dead time acquisition unit 30A of the timing prediction device 30 illustrated in FIG. 2 acquires the dead time L for the control system including the heating device 300 (see FIG. 5). In this case, the dead time acquisition unit 30A can acquire the dead time L using the result of the PID tuning described above. For example, as an example, in a case in which autotuning by the limit cycle method is performed as PID tuning, the relationship of TD=0.5×L can be established between a differential time TD and the dead time L.

Next, in step S22, the disturbance start time acquisition unit 30B of the timing prediction device 30 acquires a disturbance start time B (see FIG. 5). In this case, the disturbance acquisition time B can be acquired using the waveform illustrated in FIG. 5 obtained in the disturbance tuning. That is, referring to FIG. 5, the disturbance start time B is the period from the time point at which the operation is started (the start signal SS is received) to the disturbance start time point ti (a period from a time point at which the start signal SS is input to a time point at which the temperature T starts to be affected by the disturbance D).

Next, in step S23, the timing prediction unit 30C of the timing prediction device 30 acquires a waiting time A (see FIG. 5). In this case, the waiting time A is obtained by the calculation formula of A=B−L using the disturbance start time B and the dead time L. FIG. 5 illustrates the relationship among the waiting time A, the disturbance start time B, and the dead time L together with a waveform. Then, the timing prediction unit 30C predicts the disturbance manipulated variable application timing on the basis of each of the times A, B, and L.

For example, it is assumed that the disturbance start time B is equal to or longer than the dead time L. In this case (that is, when B≥L), the timing prediction unit 30C predicts, as the disturbance manipulated variable application timing, a time point at which the time represented by a difference (B−L) between the disturbance start time B and the dead time L elapses from the time point at which the start signal SS is input. That is, the timing prediction unit 30C predicts, as the disturbance manipulated variable application timing, a time point at which the waiting time A has elapsed from the time point at which the start signal SS is input.

For example, it is assumed that the disturbance start time B is less than the dead time L. In this case (that is, when B≤L), the timing prediction unit 30C predicts the time point at which the start signal SS is input as the disturbance manipulated variable application timing. In this case, in a case in which the disturbance start time B is less than the dead time L, the notification device 60 included in the temperature control device 200 may notify that the disturbance start time B is less than the dead time L.

As described above, when the disturbance manipulated variable application timing prediction process (step S3 in FIG. 3) ends, the preparation process illustrated in FIG. 3 also ends.

(Heating Device Control Process)

The operation of the heating device control process performed after the preparation process will be described next. Generally speaking, in the heating device control process, the temperature control device 200 transmits manipulated variables O, DO obtained by applying the disturbance manipulated variable DO to the PID manipulated variable O in a feed-forward manner to the heating device 300. In addition, the temperature control device 200 according to this embodiment applies the disturbance manipulated variable DO to the PID manipulated variable O at the timing in consideration of the dead time L.

Figure 7:
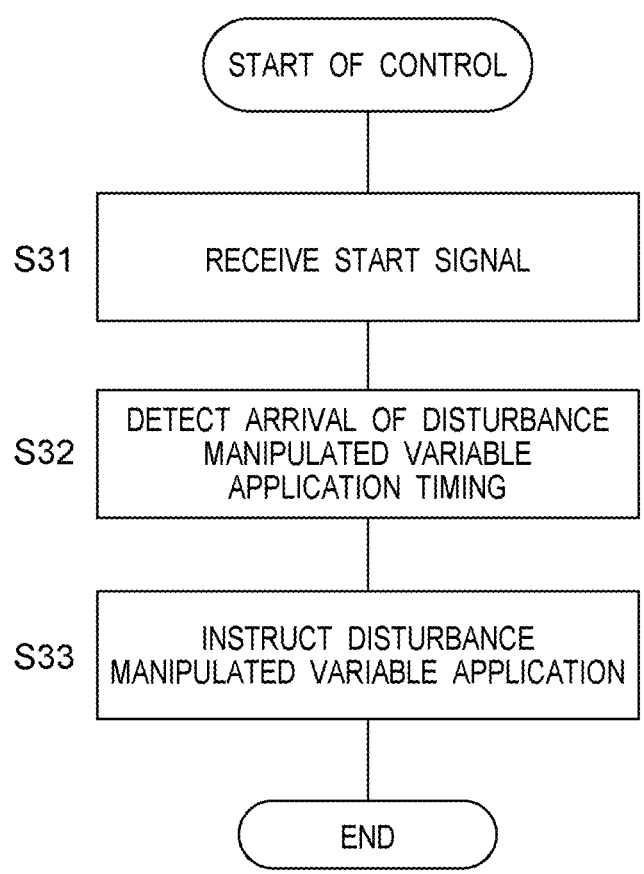
FIG. 7 is a flowchart showing a procedure of a heating device control process in the temperature control device.

The heating device control process will be described in detail with reference to FIGS. 7 and 8. FIG. 7 illustrates the operation of the heating device control process. FIG. 8 illustrates the operation of the heating device control process in time series. The upper part of FIG. 8 has the same content as that in FIG. 5 and illustrates a temporal change in the temperature T and each of times A, B, and L in a case in which the disturbance manipulated variable DO is not applied. The lower part of FIG. 8 illustrates a time-series change in the disturbance manipulated variable DO applied in the heating device control process.

The control system described above creates a state in which the temperature T substantially matches the target value TO. Thereafter, the operation of the process (conveyance and heating) for the object to be heated is started. At the time of the start, the system control device 100 transmits the start signal SS described above to the temperature control device 200 (see FIG. 8). As a result, the temperature control device 200 (more specifically, the timing prediction device 30) receives the start signal SS (step S31 in FIG. 7).

When the conveyance of the object to be heated into the system is started, the disturbance D by the disturbance element 70 is applied to the control system described above. Meanwhile, the temperature control device 200 receives the temperature T detected by the temperature sensor 300b of the heating device 300. The PID controller 15 of the temperature control device 200 receives the difference between the target value TO and the received temperature T. The PID controller 15 then outputs the PID manipulated variable O corresponding to the difference. That is, the PID controller 15 outputs the PID manipulated variable O so as to eliminate the temperature deviation |TO−T| between the target value TO and the temperature T using each parameter determined by the PID tuning.

After the timing prediction device 30 receives the start signal SS, a timer included in the application instruction unit 30D starts measuring the time. In addition, the application instruction unit 30D acquires the disturbance manipulated variable application timing predicted in the preparation process in advance from the timing prediction unit 30C. In this case, as described above, the disturbance manipulated variable application timing is determined according to the magnitude relationship between the disturbance start time B and the dead time L.

For example, it is assumed that the disturbance start time B is equal to or longer than the dead time L. According to the above assumption, the disturbance manipulated variable application timing is a time point when the waiting time A has elapsed after the start time SS is received. Accordingly, in step S22 of FIG. 7, a time point at which the time measured by the application instruction unit 30D reaches the waiting time A is detected. Then, at the time of the detection, the application instruction unit 30D transmits an application instruction signal AIS to the disturbance manipulated variable application unit 25 (step S33). As a result, the disturbance manipulated variable application unit 25 that has received the application instruction signal AIS can start feed-forward application of the disturbance manipulated variable DO with respect to the PID manipulated variable O when the waiting time A has elapsed after reception of the start time SS.

In this case, the disturbance manipulated variable DO to be applied is determined by the disturbance manipulated variable prediction unit 20 in the preparation process and acts to cancel the disturbance D. The lower part of FIG. 8 illustrates a time-series change in the disturbance manipulated variable DO, which is predicted by the disturbance manipulated variable prediction unit 20 and includes a plurality of segments Sa to Sd. Note that, as described above, the lower part of FIG. 8 illustrates the operation of starting the application of the disturbance manipulated variable DO at the time when the waiting time A has elapsed after the reception of the start time SS.

(Effects)

The temperature control device 200 to which the disturbance suppression apparatus according to this embodiment is applied includes the timing prediction device 30. The timing prediction device 30 includes the dead time acquisition unit 30A, the disturbance start time acquisition unit 30B, and the timing prediction unit 30C. The dead time acquisition unit 30A performs the PID tuning on the control system (including the PID controller 15 and the heating device 300) to acquire the dead time L. In addition, the disturbance start time acquisition unit 30B acquires the disturbance start time B representing a period from a time point at which the start signal SS is input to a time point at which the temperature T starts to be affected by the disturbance D. Furthermore, the timing prediction unit 30C predicts the disturbance manipulated variable application timing on the basis of the dead time L and the disturbance start time B. Then, the disturbance manipulated variable application unit 25 applies the disturbance prediction amount DO predicted by the disturbance manipulated variable prediction unit 20 to the PID manipulated variable O using the disturbance manipulated variable application timing.

Therefore, the disturbance manipulated variable DO for canceling the disturbance D of which application is predicted can be applied to the PID manipulated variable O at an appropriate timing (that is, the timing in consideration of the dead time L). Therefore, the influence of the disturbance D can be appropriately and simply suppressed. Note that the timing of applying the disturbance manipulated variable DO can be automatically predicted by the above configuration.

Note that the above description refers to a case in which the system control device 100 transmits the start signal SS to the temperature control device 200 at the timing when the operation of the process (conveyance and heating) on the object to be heated is started. However, the timing at which the start signal SS is transmitted is not limited to this. For example, the system control device 100 can also transmit the start signal SS to the temperature control device 200 from the start of the operation of the process (conveyance and heating) on the object to be heated until the disturbance D is applied to the control system. The timing of the start signal SS employed in the heating device control process is the same as the transmission timing of the start signal SS employed in the preparation process.

Furthermore, in the temperature control device 200 according to this embodiment, when the disturbance start time B is equal to or longer than the dead time L (that is, when B≥L), the timing prediction unit 30 predicts, as the disturbance manipulated variable application timing, a time point at which a time (waiting time A) represented by a difference (B−L) between the disturbance start time B and the dead time L elapses from a time point at which the start signal SS is input. This can predict an appropriate disturbance manipulated variable application timing in a case in which the disturbance start time B is equal to or longer than the dead time L.

Furthermore, in the temperature control device 200 according to this embodiment, when the disturbance start time B is less than the dead time L (that is, when B<L), the timing prediction unit 30C predicts the time point at which the start signal SS is input as the disturbance manipulated variable application timing. This can apply the disturbance manipulated variable DO to the PID manipulated variable O without any waiting time A after the input of the start signal SS in a case in which the disturbance start time B is less than the dead time L.

The temperature control device 200 according to this embodiment further includes a notification device that notifies that the disturbance start time B is less than the dead time L when the disturbance start time B is less than the dead time L. Therefore, when the user recognizes the notification, the user can correct the transmission timing of the start signal SS (for example, can quicken the transmission timing) by changing the setting in the system control device 100.

The above embodiment is an exemplary, and various modifications can be made without departing from the scope of the present invention. Each of the above embodiments can be implemented independently, but combinations of the embodiments are also possible. In addition, various features in different embodiments can also be independently implemented, but combinations of features in different embodiments are also possible.

REFERENCE SIGNS LIST

15 PID controller
20 disturbance manipulated variable prediction unit
25 disturbance manipulated variable application unit
30 timing prediction device
30A dead time acquisition unit
30B disturbance start time acquisition unit
30C timing prediction unit
60 notification device
70 disturbance element
100 system control device
200 temperature control device
300 heating device
400 workpiece conveyance device

The invention claimed is:

1. A disturbance suppression apparatus that suppresses an influence of a disturbance on a control system,
the control system including a controlled target and a PID controller configured to output a PID manipulated variable to the controlled target so as to eliminate a deviation between a target value and a controlled value,
the disturbance suppression apparatus comprising:
a disturbance manipulated variable prediction unit configured to predicts a disturbance manipulated variable that acts in response to a disturbance applied to the control system so as to cancel the disturbance;
a disturbance manipulated variable application unit configured to be capable of applying the disturbance manipulated variable to the PID manipulated variable; and
a timing prediction device configured to predicts a disturbance manipulated variable application timing at which the disturbance manipulated variable is to be applied to the PID manipulated variable, and
the timing prediction device including
a dead time acquisition unit configured to performs PID tuning on the control system to adjust a control parameter of the PID controller to acquire a dead time representing a period from when the PID manipulated variable is changed to when the controlled value starts to change,
a disturbance start time acquisition unit configured to receives a start signal related to a disturbance occurrence timing from an outside and acquires a disturbance start time representing a period from a time point at which the start signal is input to a time point at which the controlled value starts to be affected by the disturbance, and
a timing prediction unit configured to predicts the disturbance manipulated variable application timing based on the dead time and the disturbance start time.

2. The disturbance suppression apparatus according to claim 1, wherein, when the disturbance start time is equal to or longer than the dead time, the timing prediction unit predicts, as the disturbance manipulated variable application timing, a time point at which a time represented by a difference between the disturbance start time and the dead time elapses from a time point at which the start signal is input.

3. The disturbance suppression apparatus according to claim 2, characterized in that, when the disturbance start time is less than the dead time, the timing prediction unit predicts, as the disturbance manipulated variable application timing, a time point at which the start signal is input.

4. The disturbance suppression apparatus according to claim 2, characterized by further comprising a notification device that notifies that the disturbance start time is less than the dead time when the disturbance start time is less than the dead time.

5. The disturbance suppression apparatus according to claim 3, characterized by further comprising a notification device that notifies that the disturbance start time is less than the dead time when the disturbance start time is less than the dead time.

6. The disturbance suppression apparatus according to claim 1, wherein, when the disturbance start time is less than the dead time, the timing prediction unit predicts, as the disturbance manipulated variable application timing, a time point at which the start signal is input.

7. The disturbance suppression apparatus according to claim 6, characterized by further comprising a notification device that notifies that the disturbance start time is less than the dead time when the disturbance start time is less than the dead time.

8. The disturbance suppression apparatus according to claim 1, comprising a notification device that notifies that the disturbance start time is less than the dead time when the disturbance start time is less than the dead time.

9. A disturbance suppression method that suppresses an influence of a disturbance on a control system, the control system including a controlled target and a PID controller configured to output a PID manipulated variable to the controlled target so as to eliminate a deviation between a target value and a controlled value, and the disturbance suppression method comprising:

predicting a disturbance manipulated variable that acts in response to a disturbance applied to the control system so as to cancel the disturbance;

performing PID tuning on the control system to adjust a control parameter of the PID controller to acquire a dead time representing a period from when the PID manipulated variable is changed to when the controlled value starts to change;

receiving a start signal related to a disturbance occurrence timing from an outside and acquiring a disturbance start time representing a period from a time point at which the start signal is input to a time point at which the controlled value starts to be affected by the disturbance;

predicting a disturbance manipulated variable application timing based on the dead time and the disturbance start time; and applying the disturbance manipulated variable to the PID manipulated variable based on the disturbance manipulated variable application timing.

10. A non-transitory computer-readable storage medium storing a program for causing a computer to execute the disturbance suppression method according to claim 9.

* * * * *